US012562571B2

(12) United States Patent
Sun et al.

(10) Patent No.: US 12,562,571 B2
(45) Date of Patent: Feb. 24, 2026

(54) GRID FREQUENCY DEVIATION RESPONSE CONTROL SYSTEM AND METHOD

(71) Applicant: CHINA ELECTRIC POWER RESEARCH INSTITUTE, Beijing (CN)

(72) Inventors: Huadong Sun, Beijing (CN); Wenfeng Li, Beijing (CN); Jian Zhang, Beijing (CN); Qiang Guo, Beijing (CN); Wei Wei, Beijing (CN)

(73) Assignee: CHINA ELECTRIC POWER RESEARCH INSTITUTE, Beijing (CN)

( * ) Notice: Subject to any disclaimer, the term of this patent is extended or adjusted under 35 U.S.C. 154(b) by 25 days.

(21) Appl. No.: 18/704,119

(22) PCT Filed: Jan. 20, 2022

(86) PCT No.: PCT/CN2022/072980
§ 371 (c)(1),
(2) Date: Apr. 24, 2024

(87) PCT Pub. No.: WO2023/087535
PCT Pub. Date: May 25, 2023

(65) Prior Publication Data
US 2024/0413638 A1     Dec. 12, 2024

(30) Foreign Application Priority Data

Nov. 19, 2021     (CN) .......................... 202111372645.4

(51) Int. Cl.
*H02J 3/24*        (2006.01)
*H02J 3/32*        (2006.01)
*H02J 7/00*        (2006.01)

(52) U.S. Cl.
CPC ................ *H02J 3/241* (2020.01); *H02J 3/32* (2013.01); *H02J 7/0048* (2020.01); *H02J 7/00712* (2020.01); *H02J 2203/10* (2020.01)

(58) Field of Classification Search
CPC ...................................................... H02J 3/241
See application file for complete search history.

(56) References Cited

U.S. PATENT DOCUMENTS

2012/0104755 A1*  5/2012  Hashimoto ............. F03D 7/048
                                                                290/44
2013/0054987 A1*  2/2013  Pfeiffer ..................... H02J 3/14
                                                                713/300
(Continued)

FOREIGN PATENT DOCUMENTS

CN        103441534 A      12/2013
CN        103746408 A      4/2014
(Continued)

OTHER PUBLICATIONS

International Search Report in the international application No. PCT/CN2022/072980, mailed on Jul. 29, 2022, 3 pages.
(Continued)

*Primary Examiner* — Adi Amrany
(74) *Attorney, Agent, or Firm* — Cooper Legal Group, LLC

(57)            ABSTRACT

Provided are a frequency modulation method, device and system based on a new energy support machine and an energy storage device, and a new energy field station. The method includes: acquiring a system frequency offset value; determining a frequency modulation scheme for the new energy support machine and/or the energy storage device according to the system frequency offset value; generating a frequency modulation instruction for the new energy support machine and/or the energy storage device according to the frequency modulation scheme, so that the new energy sup- (Continued)

port machine and/or the energy storage device execute a corresponding frequency modulation instruction and modulate the system frequency. The method has high regularity, flexibility in rule adjustment and good real-time performance. When the system frequency of a power grid fluctuates, a new energy support machine with higher durability is selected to support the power grid. The electrochemical energy storage device with poorer durability is selected to support the power grid only when the frequency fluctuation of the system is excessive, thereby reducing the number of times the energy storage device is used, realizing the safe operation of the energy storage device, and improving the use safety of the energy storage device.

12 Claims, 4 Drawing Sheets

(56) References Cited

U.S. PATENT DOCUMENTS

| | | | | |
|---|---|---|---|---|
| 2013/0187385 A1* | 7/2013 | Wakasa | | H02J 3/381 |
| | | | | 290/44 |
| 2016/0040653 A1* | 2/2016 | Kang | | H02J 3/1885 |
| | | | | 290/44 |
| 2016/0190806 A1* | 6/2016 | Taimela | | H02M 7/44 |
| | | | | 307/62 |
| 2022/0131385 A1 | 4/2022 | Shang et al. | | |
| 2022/0149627 A1* | 5/2022 | Londono | | H02J 3/381 |
| 2022/0190599 A1* | 6/2022 | Claessens | | H02J 3/06 |
| 2022/0224118 A1* | 7/2022 | Skjelmose | | H02J 3/38 |
| 2024/0204525 A1* | 6/2024 | Ishihara | | H02J 3/16 |

FOREIGN PATENT DOCUMENTS

| | | | |
|---|---|---|---|
| CN | 107069789 A | 8/2017 |
| CN | 109802413 A | 5/2019 |
| CN | 110492532 A | 11/2019 |
| CN | 112332462 A | 2/2021 |
| CN | 112350348 A | 2/2021 |
| CN | 112510725 A | 3/2021 |
| CN | 113809761 A | 12/2021 |
| WO | 2020193533 A1 | 10/2020 |
| WO | 2021068320 A1 | 4/2021 |

OTHER PUBLICATIONS

English translation of the Written Opinion of the International Search Authority in the international application No. PCT/CN2022/072980, mailed on Jul. 29, 2022, 5 pages.

* cited by examiner

GRID FREQUENCY DEVIATION RESPONSE CONTROL SYSTEM AND METHOD

CROSS-REFERENCE TO RELATED APPLICATIONS

The application is based on and claims priority to Chinese Patent Application No. 202111372645.4, filed on Nov. 19, 2021 and entitled "FREQUENCY MODULATION METHOD BASED ON NEW ENERGY SUPPORT MACHINE AND ENERGY STORAGE DEVICE, AND NEW ENERGY STATION", the entire contents of which are incorporated herein by reference in its entirety.

TECHNICAL FIELD

The disclosure relates to the field of power system operation and control technology, and in particular to a frequency adjustment method, an apparatus and a system based on a new energy support machine and an energy storage apparatus, and a new energy station.

BACKGROUND

A blackout accident occurred on Aug. 9, 2019 in Britain. Before the accident occurred, the Little Barford gas power station was correctly shut down. After loss of generation load of the gas power station, the system frequency of the North Sea power grid was deceased. Since wind turbines of the North Sea power grid had an insufficient capacity to tolerate low frequency, a large number of wind turbines were disconnected, and the output of the wind farm plummeted, which led to a further decrease in the system frequency and triggered a low-frequency load-shedding protection action of the power grid to remove a part of the load, thereby causing the blackout accident.

With reference to the above blackout accident, in a power grid with a high proportion of new energy, characteristics of the new energy are very obvious, and the security problem of the new energy grid connection is very serious. Especially, in a near-area power grid at an ultra-high voltage Direct Current (DC) sending end, proportion of the new energy convergence is high, and clustering is obvious. The problems of voltage, inertia, and frequency adjustment of the power system are getting more and more serious.

At present, in some power grids with a high proportion of new energy convergence, new energy support machines and energy storage apparatuses are disposed to deal with the problems of voltage, inertia and frequency adjustment of the power system. Generally, the expected life of the energy storage apparatus is more than 10 years, and the number of times of charge/discharge cycles of the lithium battery in the energy storage apparatus is roughly in the order of 3500 times. How to ensure the safe operation of the energy storage apparatus and develop its role in the power grid within the expected life is an urgent problem to be solved at present.

SUMMARY

The disclosure provides a frequency adjustment method, an apparatus and a system based on a new energy support machine and an energy storage apparatus, and a new energy station, which is designed to realize the safe operation of the energy storage apparatus and improve the utilization safety of the energy storage apparatus.

In a first aspect, the disclosure provides a frequency adjustment method based on a new energy support machine and an energy storage apparatus.

The new energy support machine is connected to a new energy grid connection point.

The energy storage apparatus is connected to the new energy grid connection point.

The method includes the following operations.

A deviation value of a system frequency is obtained.

A frequency adjustment scheme for at least one of the new energy support machine or the energy storage apparatus is determined according to the deviation value of the system frequency.

A frequency adjustment instruction for at least one of the new energy support machine or the energy storage apparatus is generated according to the frequency adjustment scheme, such that at least one of the new energy support machine or the energy storage apparatus executes a corresponding frequency adjustment instruction to adjust the system frequency.

In some embodiments of the disclosure, the operation that the frequency adjustment scheme for at least one of the new energy support machine or the energy storage apparatus is determined according to the deviation value of the system frequency may include the following operation.

A first frequency adjustment scheme is determined when it is detected that an absolute value of the deviation value of the system frequency is not greater than a first frequency control threshold. The first frequency adjustment scheme includes an operation that the new energy support machine is controlled to be connected.

In some embodiments of the disclosure, the method may further include the following operation. A first active adjustment instruction for the new energy support machine is generated within a first frequency adjustment range according to the first frequency adjustment scheme, such that the new energy support machine executes the first active adjustment instruction to adjust the system frequency by means of controlling the new energy support machine to increase a rotational speed or decrease the rotational speed.

In some embodiments of the disclosure, the operation that the frequency adjustment scheme for at least one of the new energy support machine or the energy storage apparatus is determined according to the deviation value of the system frequency may include the following operation.

A second frequency adjustment scheme is determined when it is detected that the absolute value of the deviation value of the system frequency is greater than the first frequency control threshold and less than a second frequency control threshold. The second frequency adjustment scheme includes operations that the new energy support machine is controlled to be connected and the energy storage apparatus is controlled to be connected.

The first frequency control threshold is a positive value, and the second frequency control threshold is a positive value greater than the first frequency control threshold.

In some embodiments of the disclosure, the method may further include the following operations. A first active adjustment instruction for the new energy support machine is generated within a second frequency adjustment range according to the second frequency adjustment scheme, such that the new energy support machine executes the first active adjustment instruction to adjust the system frequency by means of controlling the new energy support machine to increase a rotational speed or decrease the rotational speed.

A second active adjustment instruction for the energy storage apparatus is generated within the second frequency adjustment range according to the second frequency adjustment scheme, such that the energy storage apparatus executes the first active adjustment instruction to adjust the system frequency by means of controlling charge or discharge of the energy storage apparatus.

In some embodiments of the disclosure, after the operation that the first active adjustment instruction for the new energy support machine is generated within the first frequency adjustment range according to the first frequency adjustment scheme, the method may further include the following operation.

An expected active power instruction value of the new energy support machine corresponding to the first active adjustment instruction is corrected according to the rotational speed of the new energy support machine.

In some embodiments of the disclosure, after the operation that the second active adjustment instruction for the energy storage apparatus is generated according to the second frequency adjustment scheme within the second frequency adjustment range, the method may further include the following operation.

An expected active power instruction value of the energy storage corresponding to the second active adjustment instruction is corrected according to a state of charge of the energy storage apparatus.

In a second aspect, the disclosure provides a frequency adjustment apparatus based on a new energy support machine and an energy storage apparatus.

The new energy support machine is connected to a new energy grid connection point.

The energy storage apparatus is connected to the new energy grid connection point.

The apparatus includes an acquisition part and a processing part.

The acquisition part is configured to obtain a deviation value of a system frequency.

The processing part is configured to: determine, according to the deviation value of the system frequency, a frequency adjustment scheme for at least one of the new energy support machine or the energy storage apparatus; and generate, according to the frequency adjustment scheme, a frequency adjustment instruction for at least one of the new energy support machine or the energy storage apparatus, such that at least one of the new energy support machine or the energy storage apparatus executes a corresponding frequency adjustment instruction to adjust the system frequency.

In some embodiments of the disclosure, the processing part may be further configured to determine a first frequency adjustment scheme when it is detected that an absolute value of the deviation value of the system frequency is not greater than a first frequency control threshold. The first frequency adjustment scheme includes an operation that the new energy support machine is controlled to be connected.

In some embodiments of the disclosure, the processing part may be further configured to generate, according to the first frequency adjustment scheme, a first active adjustment instruction for the new energy support machine within a first frequency adjustment range, such that the new energy support machine executes the first active adjustment instruction to adjust the system frequency by means of controlling the new energy support machine to increase a rotational speed or decrease the rotational speed.

In some embodiments of the disclosure, the processing part may be further configured to determine a second frequency adjustment scheme when it is detected that the absolute value of the deviation value of the system frequency is greater than the first frequency control threshold and less than a second frequency control threshold. The second frequency adjustment scheme includes operations that the new energy support machine is controlled to be connected and the energy storage apparatus is controlled to be connected.

The first frequency control threshold is a positive value, and the second frequency control threshold is a positive value greater than the first frequency control threshold.

In some embodiments of the disclosure, the processing part may be further configured to: generate, according to the second frequency adjustment scheme, a first active adjustment instruction for the new energy support machine within a second frequency adjustment range, such that the new energy support machine executes the first active adjustment instruction to adjust the system frequency by means of controlling the new energy support machine to increase a rotational speed or decrease the rotational speed; and generate, according to the second frequency adjustment scheme, a second active adjustment instruction for the energy storage apparatus within the second frequency adjustment range, such that the energy storage apparatus executes the first active adjustment instruction to adjust the system frequency by means of controlling charge or discharge of the energy storage apparatus.

In some embodiments of the disclosure, the processing part may be further configured to correct, according to the rotational speed of the new energy support machine, an expected active power instruction value of the new energy support machine corresponding to the first active adjustment instruction.

In some embodiments of the disclosure, the processing part may be further configured to correct, according to a state of charge of the energy storage apparatus, an expected active power instruction value of the energy storage corresponding to the second active adjustment instruction.

In a third aspect, the disclosure provides a power grid frequency adjustment system based on a new energy support machine and an energy storage apparatus.

The power grid frequency adjustment system includes the frequency adjustment apparatus based on the new energy support machine and the energy storage apparatus of any one of the embodiments illustrated in the second aspect, a control part of the new energy support machine and a control part of the energy storage apparatus.

The control part of the new energy support machine is configured to obtain a corresponding frequency adjustment instruction from the processing part and control the new energy support machine to execute the corresponding frequency adjustment instruction.

The control part of the energy storage apparatus is configured to obtain a corresponding frequency adjustment instruction from the processing part and control the energy storage apparatus to execute the corresponding frequency adjustment instruction.

In a fourth aspect, the disclosure provides a new energy station.

The new energy station includes a new energy power generator, a new energy support machine, an energy storage apparatus and the power grid frequency adjustment system illustrated in the third aspect.

The new energy power generator is connected to a power grid at a new energy grid connection point.

The new energy support machine is connected to the new energy grid connection point.

The energy storage apparatus is connected to the new energy grid connection point.

With the frequency adjustment method based on a new energy support machine and an energy storage apparatus provided by the disclosure, a deviation value of a system frequency is obtained; a frequency adjustment scheme for at least one of the new energy support machine or the energy storage apparatus is determined according to the deviation value of the system frequency; and a frequency adjustment instruction for at least one of the new energy support machine or the energy storage apparatus is generated according to the frequency adjustment scheme, such that at least one of the new energy support machine or the energy storage apparatus executes a corresponding frequency adjustment instruction to adjust the system frequency. With the method, a frequency adjustment scheme for the new energy support machine and/or the energy storage apparatus is determined according to the deviation value of the system frequency, such that it is possible to adjust, according to a predesigned control strategy, whether the new energy support machine and/or the energy storage apparatus participates in this frequency adjustment of the power grid. The method has a high regularity, a flexibility in rule adjustment and a good real-time performance, and may realize the safe operation of the energy storage apparatus and improve the utilization safety of the energy storage apparatus.

It is to be understood that when the system frequency fluctuates, the new energy support machine is connected when the deviation value of the system frequency is in a first frequency adjustment range, and when the deviation value of the system frequency is in a second frequency adjustment range, the new energy support machine and the electrochemical energy storage apparatus are connected into the power grid at the same time to execute a primary frequency adjustment respectively, which realizes the safe operation of the energy storage apparatus and improves the utilization safety of the energy storage apparatus.

In some embodiments of the disclosure, when the system frequency fluctuation occurs in the power grid, it is preferred to connect the new energy support machine with a better durability to provide support to the power grid. Only when the system frequency fluctuation is too large, the electrochemical energy storage apparatus with a poorer durability is connected to collectively provide support to the power grid, thereby reducing the number of times of connecting the electrochemical energy storage apparatus. Under the premise that the total number of times of charge/discharge cycles does not change within the life cycle of the electrochemical energy storage apparatus, the number of times of connecting the electrochemical energy storage apparatus is actively decreased from the level of overall frequency adjustment control strategy, which may extend the service time of the electrochemical energy storage apparatus in the new energy station. Such connection strategy optimizes the device operation system, extends the service time of the device, and effectively ensures that support is provided to the power grid with a high reliability, which is conducive to a long-term stable operation of the new energy station.

DETAILED DESCRIPTION

Figure 1:
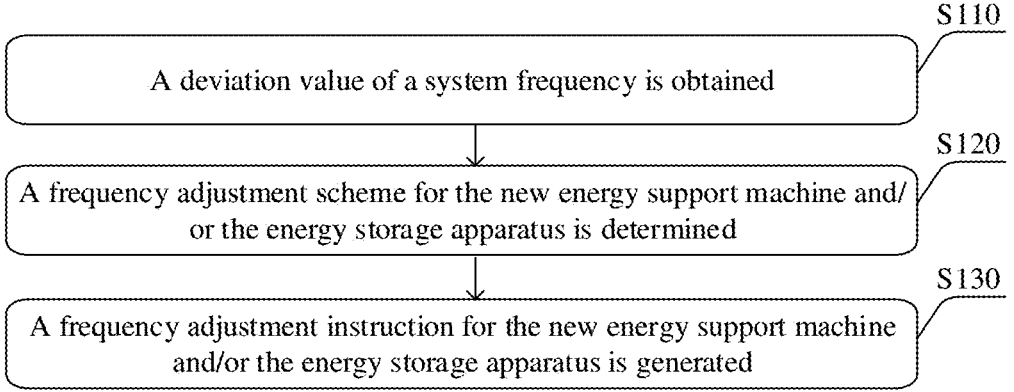
FIG. 1 is a flowchart of a frequency adjustment method based on a new energy support machine and an energy storage apparatus of an embodiment of the disclosure.

Exemplary implementations of the disclosure are now introduced with reference to the drawings. However, the disclosure may be implemented in many different forms and is not limited to the embodiments described herein. The embodiments are provided to exhaustively and completely disclose the disclosure and to fully convey the scope of the disclosure to those skilled in the art. Terms in the exemplary implementations indicated in the drawings are not limitation on the disclosure. In the drawings, the same units/components are labeled with the same reference signs.

Unless otherwise indicated, terms (including technical terms) used herein have commonly understood meanings to those skilled in the art. Further, it is to be understood that a term qualified by commonly used dictionaries should be understood as having a meaning consistent with the context of its related art, and should not be understood as an idealized or overly formal meaning.

The following are definitions of some terms and symbols.

State of charge, called SOC for short.

At present, Jiangsu Kunshan energy storage power station is the electrochemical energy storage power station with the largest capacity in China, which is a 100 MW-level battery energy storage power station. The power station consists of eight individual power stations and has a total capacity of 101 MW. The power station adopts a lithium iron phosphate battery scheme, and is connected to the 35 kV side of the 220 kV Kunshan Transformer with 4-circuit 35 kV lines. In case of a power grid fault, the power station may realize a millisecond response of 100,000 kW load, thereby ensuring safe and stable operation of the power grid.

Similar to Jiangsu Kunshan energy storage power station, most electrochemical energy storage apparatuses that have already been connected are large-capacity AC energy storage apparatuses. As an electrochemical apparatus, with the increase in the cumulative number of times of charge/discharge cycles, the performance would gradually attenuate, and the utilization safety and reliability are also gradually reduced.

In order to ensure the safe operation of the power system, when the system frequency is lower than the set threshold (the lowest frequency for safe operation of the power system), the power system would automatically cut off unimportant loads, i.e., low-frequency load-shedding. When the system frequency is higher than the set threshold (the highest frequency for safe operation of the power system), the power system would automatically cut off the generator unit, the new energy unit, or the like, i.e., high-frequency cut-off.

In a specific implementation, the lowest frequency for the safe operation of the power system is the lower threshold of the permissible frequency deviation range of the power system, and the highest frequency for the safe operation of the power system is the upper threshold of the permissible frequency deviation range of the power system. The following involved deviation value of the system frequency is not greater than the deviation between the maximum frequency for the safe operation of the power system and the rated system frequency (which is a positive value), and is not less than the deviation between the minimum frequency for the safe operation of the power system and the rated system frequency (which is a negative value).

In some embodiments of the disclosure, as shown in FIG. 1, in order to ensure the safe operation of the energy storage apparatus and improve the utilization safety of the energy storage apparatus, an embodiment of the disclosure provides a frequency adjustment method based on a new energy support machine and an energy storage apparatus. The method includes the following operations.

In operation S110, a deviation value of a system frequency is obtained.

In operation S120, a frequency adjustment scheme for at least one of the new energy support machine or the energy storage apparatus is determined according to the deviation value of the system frequency.

In operation S130, a frequency adjustment instruction for at least one of the new energy support machine or the energy storage apparatus is generated according to the frequency adjustment scheme, such that at least one of the new energy support machine or the energy storage apparatus executes a corresponding frequency adjustment instruction to adjust the system frequency.

In some embodiments of the disclosure, the operation that the frequency adjustment scheme for at least one of the new energy support machine or the energy storage apparatus is determined according to the deviation value of the system frequency includes the following operation.

A first frequency adjustment scheme is determined when it is detected that an absolute value of the deviation value of the system frequency is not greater than a first frequency control threshold. The first frequency adjustment scheme includes an operation that the new energy support machine is controlled to be connected.

In some embodiments of the disclosure, a first active adjustment instruction for the new energy support machine is generated within a first frequency adjustment range according to the first frequency adjustment scheme, such that the new energy support machine executes the first active adjustment instruction to adjust the system frequency by means of controlling the new energy support machine to increase a rotational speed or decrease the rotational speed.

In some embodiments of the disclosure, a second frequency adjustment scheme is determined when it is detected that the absolute value of the deviation value of the system frequency is greater than the first frequency control threshold and less than a second frequency control threshold. The second frequency adjustment scheme includes the operation that the new energy support machine is controlled to be connected and the operation that the energy storage apparatus is controlled to be connected. The first frequency control threshold is a positive value, and the second frequency control threshold is a positive value greater than the first frequency control threshold.

In some embodiments of the disclosure, a first active adjustment instruction for the new energy support machine is generated within a second frequency adjustment range according to the second frequency adjustment scheme, such that the new energy support machine executes the first active adjustment instruction to adjust the system frequency by means of controlling the new energy support machine to increase a rotational speed or decrease the rotational speed. A second active adjustment instruction for the energy storage apparatus is generated within the second frequency adjustment range according to the second frequency adjustment scheme, such that the energy storage apparatus executes the first active adjustment instruction to adjust the system frequency by means of controlling charge or discharge of the energy storage apparatus.

Figure 2:
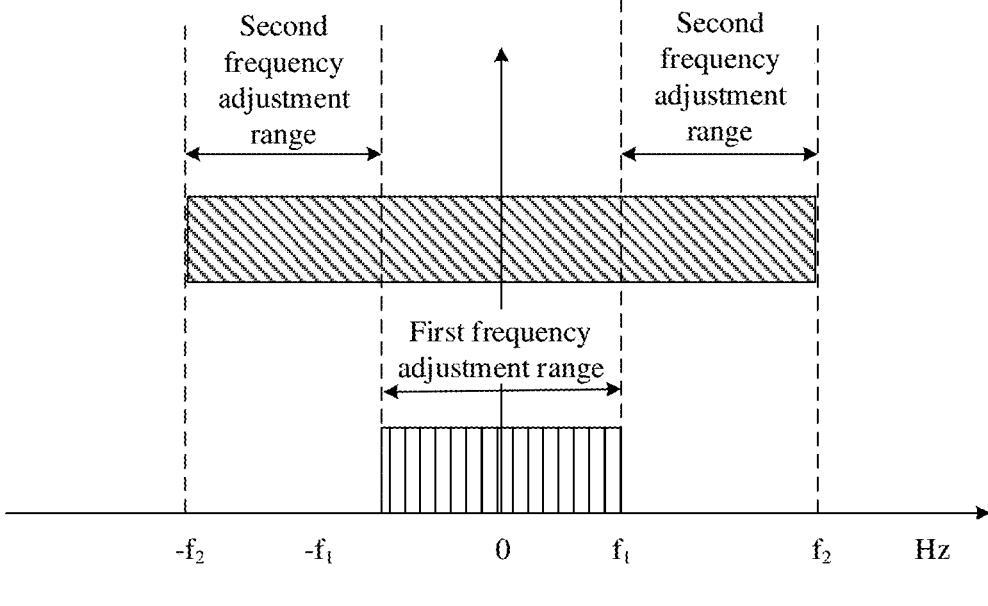
FIG. 2 is a diagram of a frequency adjustment range realized by a frequency adjustment method based on a new energy support machine and an energy storage apparatus of an embodiment of the disclosure.

In some embodiments of the disclosure, as shown in FIG. 2, $f_1$ is the first frequency control threshold and $f_2$ is the second frequency control threshold. According to the frequency adjustment method of the embodiment of the disclosure, when it is detected that the absolute value of the deviation value of the system frequency is greater than the first frequency control threshold $f_1$ and less than the second frequency control threshold $f_2$, the second frequency adjustment scheme is generated, and the energy storage apparatus and the new energy support machine are controlled to be connected respectively to execute the primary frequency adjustment of a current round. When it is detected that the absolute value of the deviation value of the system frequency is less than the first frequency control threshold $f_1$ and less than the second frequency control threshold $f_2$, the first frequency adjustment scheme is generated, and the new energy support machine is controlled to be connected to execute the primary frequency adjustment of the current round.

According to the frequency adjustment method of the embodiment of the disclosure, when the system frequency fluctuates, the new energy support machine is connected when the deviation value of the system frequency is in the first frequency adjustment range. The new energy support machine and the electrochemical energy storage apparatus are connected into the power grid simultaneously when the deviation value of the system frequency is in the second frequency adjustment range, to execute the primary frequency adjustment respectively.

When the system frequency fluctuation occurs in the power grid, the new energy support machine with a better durability is connected to provide support to the power grid. Only when the system frequency fluctuation is too large, the electrochemical energy storage apparatus with a poorer durability is connected to collectively provide support to the power grid, thereby reducing the number of times of connecting the electrochemical energy storage apparatus.

Under the premise that the total number of times of charge/discharge cycles does not change within the life cycle of the electrochemical energy storage apparatus, the number of times of connecting the electrochemical energy storage apparatus is actively decreased from the level of overall frequency adjustment control strategy, which may extend the service time of the electrochemical energy storage apparatus in the new energy station. Such connection strategy optimizes the device operation system, extends the service time of the device, and effectively ensures that support is provided to the power grid with a high reliability, which is conducive to a long-term stable operation of the new energy station.

In some embodiments of the disclosure, after the operation that the first active adjustment instruction for the new energy support machine is generated within the first frequency adjustment range according to the first frequency adjustment scheme, the method further includes the following operation.

An expected active power instruction value of the new energy support machine corresponding to the first active adjustment instruction is corrected according to the rotational speed of the new energy support machine.

In some embodiments of the disclosure, after the operation that the second active adjustment instruction for the energy storage apparatus is generated according to the second frequency adjustment scheme within the second frequency adjustment range, the method further includes the following operation.

An expected active power instruction value of the energy storage corresponding to the second active adjustment instruction is corrected according to a state of charge of the energy storage apparatus.

Figure 3:
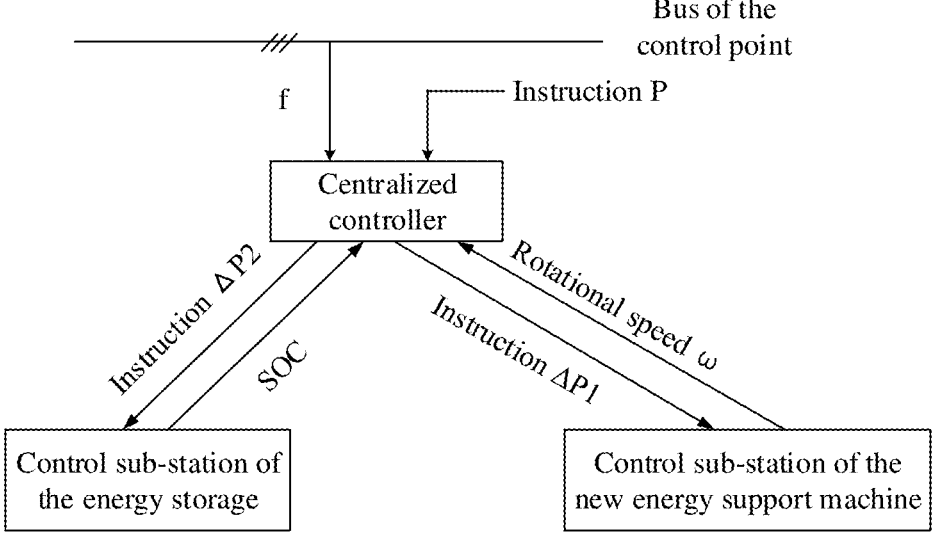
FIG. 3 is a diagram of a flow of control information of a power grid frequency adjustment system based on a new energy support machine and an energy storage apparatus of an embodiment of the disclosure.

In some embodiments of the disclosure, as shown in FIG. 3, a centralized controller is disposed in the new energy station and is connected to the bus of the AC power grid through a control point. The centralized controller is configured to control the electrochemical energy storage apparatus and the new energy support machine respectively. The centralized controller is further configured to read the system frequency f of the AC power grid, read a rotational speed $N_1$ of a rotor of a doubly-fed asynchronous generator and the SOC of the energy storage apparatus.

In some embodiments of the disclosure, the aforementioned frequency adjustment apparatus, i.e., the centralized controller shown in FIG. 3 (which may also be referred to as a station-level controller since it is disposed in a station) generates a frequency adjustment instruction according to an obtained current system frequency and an active power adjustment instruction P from the upper dispatching department. The frequency adjustment instruction includes a first active adjustment instruction $\Delta P_1$ which is sent to a control sub-station of the new energy support machine, and a second active adjustment instruction $\Delta P_2$ which is sent to a control sub-station of the electrochemical energy storage.

In response to the first active adjustment instruction $\Delta P_1$, the control sub-station of the new energy support machine controls the new energy support machine to adjust the active power $P_S$ and electrical energy interacting between the stator of the new energy support machine and the power grid by adjusting the rotational speed of the rotor of the new energy support machine, so as to ultimately adjust the system frequency.

In response to the second frequency adjustment instruction $\Delta P_2$, the control sub-station of the energy storage apparatus controls the electrochemical energy storage apparatus to adjust the electrical energy or active power interacting between the electrochemical energy storage apparatus and the power grid by adjusting the SOC of the electrochemical energy storage apparatus, so as to ultimately adjust the system frequency.

Figure 4:
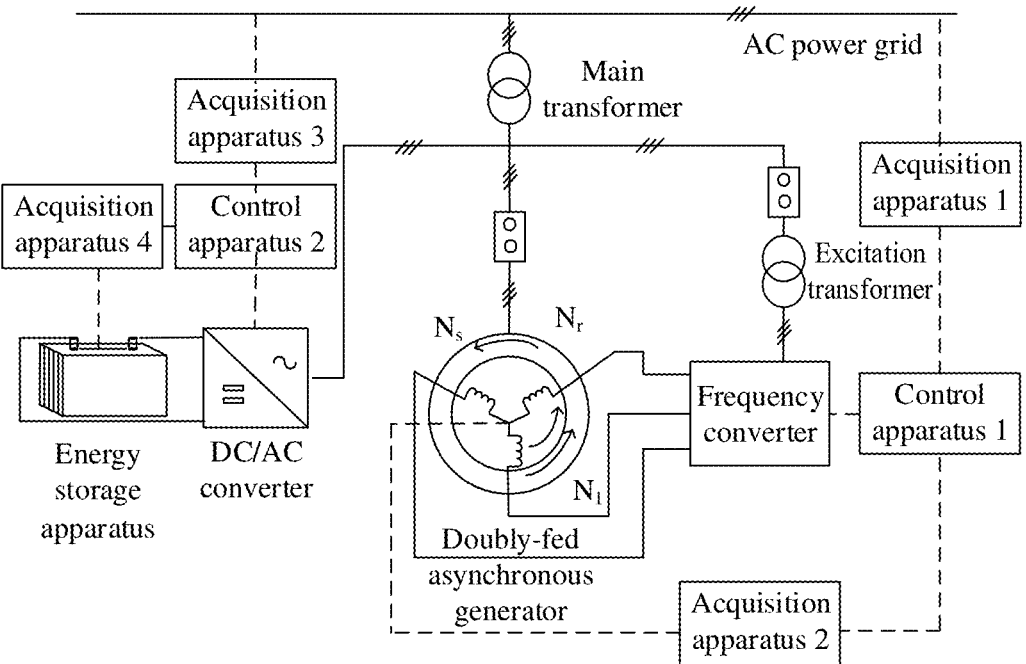
FIG. 4 is a composition diagram of a power grid frequency adjustment system based on a new energy support machine and an energy storage apparatus of an embodiment of the disclosure.

In some embodiments of the disclosure, as shown in FIG. 4, the control sub-station of the new energy support machine is equipped with a control apparatus 1, and the control sub-station of the energy storage is equipped with a control apparatus 2. The control apparatus 1 and control apparatus 2 are respectively configured to receive and control the execution of at least one of the active power instruction value $\Delta P_{10}$ of the new energy support machine and the active power instruction value $\Delta P_{20}$ of the energy storage apparatus. The control sub-station of the new energy support machine is further equipped with an acquisition apparatus 1 and an acquisition apparatus 2 for acquiring the system frequency and the rotational speed $N_1$ of the rotor of the doubly-fed asynchronous generator, respectively. The control sub-station of the energy storage is further equipped with an acquisition apparatus 3 and an acquisition apparatus 4 for acquiring the system frequency and the SOC of the electrochemical energy storage apparatus, respectively. The control sub-station of the energy storage is further equipped with a DC/AC converter for converting the active power instruction value $\Delta P_{20}$ received by the control apparatus 2 in a power level.

In some embodiments of the disclosure, as shown in FIG. 4, the new energy support machine is disposed near the grid connection point of the new energy station, and the new energy support machine includes a main transformer, an excitation transformer, a doubly-fed asynchronous generator, a frequency converter, an acquisition apparatus 1 and a control apparatus 1. The main transformer is configured to transform a voltage to a voltage value that matches the stator of the doubly-fed asynchronous generator. As shown in FIG. 4, the primary side of the main transformer is connected to the AC power grid, and the secondary side of the main transformer is connected to the stator of the doubly-fed asynchronous generator. The frequency converter includes a machine-side converter (consisting of an AC-DC link) and a grid-side converter (consisting of an AC-DC link). Both the grid-side converter and the machine-side converter are fully controlled type converters. The grid-side converter and the machine-side converter have various control modes, and the embodiments of the disclosure adopt the following control mode. The grid-side converter is of fixed DC voltage control and fixed reactive power control. The control mode of the machine-side converter is fixed active power control and fixed reactive power control. The specific control target and control instruction are determined by the control apparatus 1. The excitation transformer is configured to transform a voltage to a voltage value that matches the grid-side converter. The machine-side converter is connected to the rotor side of the doubly-fed asynchronous generator.

Figure 5:
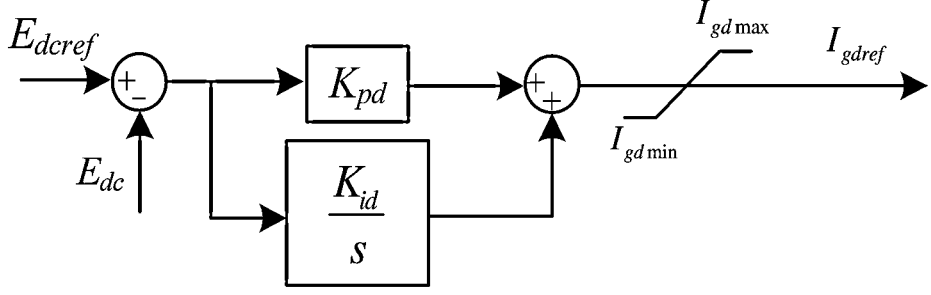
FIG. 5 is a diagram of fixed DC voltage control of a grid-side converter under a power grid frequency adjustment system based on a new energy support machine and an energy storage apparatus of an embodiment of the disclosure.

Exemplarily, a diagram of fixed DC voltage control of a grid-side converter is shown in FIG. 5. $E_{dcref}$ is the reference value of the voltage of the DC side of the frequency converter, $E_{dc}$ is the voltage of the DC side of the frequency converter, $K_{pd}$ is a constant of the proportional link of the DC voltage control of the grid-side converter, $K_{id}$ is a constant of the integral link of the DC voltage control of the grid-side converter, s is a Laplace operator, $I_{gdmax}$ and $I_{gdmin}$ are the upper threshold and lower threshold of the current of the DC voltage control link of the grid-side converter respectively, and $I_{gdref}$ is the d-axis reference current output in the DC voltage control link of the grid-side converter. As shown in FIG. 5, $E_{dcref}$ and Ede are input into the grid-side converter together, in which $E_{dcref}$ is positively input and $E_{dc}$ is negatively input, and then positively output after $K_{pd}$ processing and $$\frac{K_{id}}{S}$$

processing. $I_{gdref}$ is obtained after $I_{gdmax}$ and $I_{gdmin}$ processings.

Figure 6:
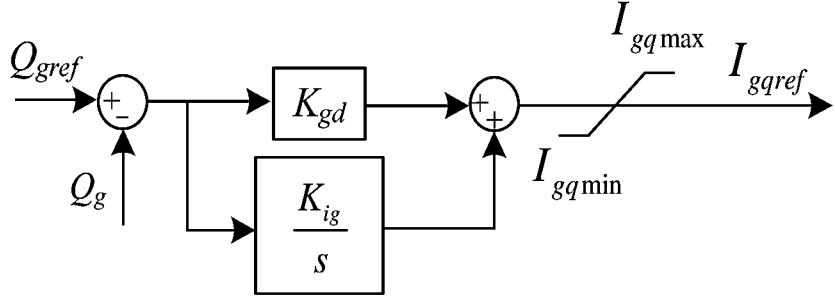
FIG. 6 is a diagram of fixed reactive power control of a grid-side converter under a power grid frequency adjustment system based on a new energy support machine and an energy storage apparatus of an embodiment of the disclosure.

A diagram of fixed reactive power control of a grid-side converter is shown in FIG. 6. $Q_{gref}$ is the reference value of the reactive power of the grid-side converter, $Q_g$ is the reactive power of the grid-side converter, $K_{gd}$ is a constant of the proportional link of the reactive power control of the grid-side converter, $K_{ig}$ is a constant of the integral link of the reactive power control of the grid-side converter, $I_{gqmax}$ and $I_{gqmin}$ are the upper threshold and lower threshold of the current of the reactive power control link of the grid-side converter respectively, and $I_{gqref}$ is the q-axis reference current output in the reactive power control link of the grid-side converter. As shown in FIG. 6, $Q_{gref}$ and $Q_g$ are input into the grid-side converter together, in which $Q_{gref}$ is positively input and $Q_g$ is negatively input, and then positively output after $K_{gd}$ processing and $$\frac{K_{gd}}{S}$$

processing. $I_{gqref}$ is obtained after $I_{gqmax}$ and $I_{gqmin}$ processings.

Figure 7:
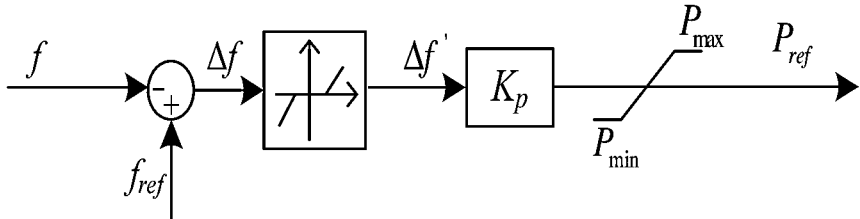
FIG. 7 is a diagram of fixed active power control of a machine-side converter under a power grid frequency adjustment system based on a new energy support machine and an energy storage apparatus of an embodiment of the disclosure.

A diagram of fixed active power control of a machine-side converter is shown in FIG. 7. f is the frequency of the AC power grid, $f_{ref}$ is the reference value of the frequency, $\Delta f$ is the difference of the frequency deviating from the rated value, $\Delta f$ is the change ratio of the frequency, $K_p$ is the sag control coefficient, $P_{max}$ and $P_{min}$ are the maximum value and minimum value of the active power instruction limiting link of the machine-side converter respectively, and $P_{ref}$ is the active power instruction of the machine-side converter. In addition to the parameter indicators shown in FIG. 7, Pf and Pint are further included. Pf is the additional power instruction for additional primary frequency adjustment control of the doubly-fed regulator, and Pint is the additional power control instruction for additional inertia control of the doubly-fed regulator. As shown in FIG. 7, $f_{ref}$ and f are input into the machine-side converter together, in which $f_{ref}$ is positively input and f is negatively input, and $\Delta f$ is obtained. $\Delta f'$ is obtained after deadband processing, and $P_{ref}$ is obtained after $K_p$ processing, and $P_{max}$ and $P_{min}$ processing.

Figure 8:
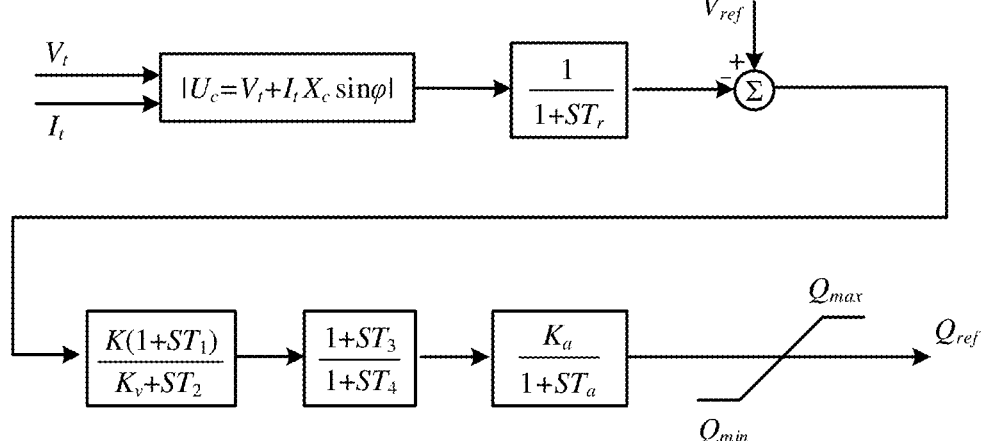
FIG. 8 is a diagram of fixed reactive power control of a machine-side converter under a power grid frequency adjustment system based on a new energy support machine and an energy storage apparatus of an embodiment of the disclosure.

A diagram of fixed reactive power control of a machine-side converter is shown in FIG. 8. $V_t$ is the voltage of the grid connection point of the doubly-fed regulator, $V_{ref}$ is the reference voltage, $I_t$ is the grid connection current of the doubly-fed regulator, $X_c$ is the additional compensation reactance, $\varphi$ is the additional compensation factor angle, $U_c$ is the voltage of the grid connection point of the doubly-fed regulator after additional compensation, $T_r$ is a time constant of the filtering link, $T_1$ and $T_2$ are time constants of the first series correction link respectively, $T_3$ and $T_4$ are time constants of the second series correction link respectively, and K is the DC gain of the series correction link. $K_v$ is the selection factor of the integral correction link. $K_v=0$ indicates pure integral correction, and $K_v=1$ indicates proportional integral correction. $K_a$ is the gain of the amplification link, $T_a$ is a time constant of the amplification link, $Q_{max}$ and $Q_{min}$ are the upper threshold and lower threshold of the reference value of the reactive power respectively, and $Q_{ref}$ is the reference value of the reactive power. As shown in FIG. 8, $V_t$ and $I_t$ are input, and $U_c$ is obtained through the calculation of $|U_c=V_t+I_tX_c \sin \varphi|$. The result after $$\frac{1}{1+ST_r}$$

processing is then negatively output and summed with the positively input $V_{ref}$ to output a first operation result, and then $$\frac{K(1+ST_1)}{K_v+ST_2}, \frac{1+ST_3}{1+ST_4} \text{ and } \frac{K_a}{1+ST_a}$$

operations are continuously performed to output a second operation result. $Q_{ref}$ is obtained after $Q_{max}$ and $Q_{min}$ processings.

The doubly-fed asynchronous generator is a wound asynchronous generator of which the rotor is AC-excited. During an operation in a steady state, the current frequency f of the stator is the same as the system frequency f of the AC power grid.

Assuming that the system frequency detected by the acquisition apparatus 1 is f, the rotational speed of the rotor of the doubly-fed asynchronous generator is converted to a frequency $f_1$, and the three-phase AC excitation frequency connected to the machine-side converter is $f_2$, there is a relationship as follows.

$$f = f_1 \pm f_2 \tag{1}$$

Assuming that the number of pole pairs of the doubly-fed asynchronous generator is p, and the rotational speed $N_1$ of the rotor is converted to a frequency $f_1$, there is a relationship as follows.

$$f_1 = p * N_1/60 \tag{2}$$

The control apparatus 1 determines the deviation value $\Delta f$ of the system frequency and the absolute value thereof according to the frequency f of the stator obtained by the acquisition apparatus 1 and the rotational speed $N_1$ of the rotor obtained by the acquisition apparatus 2 (i.e., $\omega=\pi N_1/30$).

In some embodiments of the disclosure, as shown in FIG. 4, the control apparatus 1 is configured to provide support to the power grid by controlling the rotational speed $N_1$ of the rotor of the doubly-fed asynchronous generator when the system frequency f fluctuates. For example, when the system frequency f decreases due to an increase in load or a decrease in power generation in the power grid, by decreasing the rotational speed of the rotor of the doubly-fed asynchronous generator, the decreased kinetic energy of the doubly-fed asynchronous generator flows through the rotor and the stator sequentially and is then injected into the power grid. That is, the new energy support machine injects energy into the power grid. For example, when the system frequency f increases due to a decrease in load or an increase in power generation in the power grid, by increasing the rotational speed of the rotor of the doubly-fed asynchronous generator, the surplus electric energy of the power grid flows through the stator and the rotor sequentially and is then stored as kinetic energy of the stator. That is, the new energy support machine absorbs energy from the power grid.

In some embodiments of the disclosure, as shown in FIG. 4, the control apparatus 2 is configured to provide support to the power grid by controlling the SOC of the energy storage apparatus to increase or decrease when the system frequency f fluctuates. For example, when the system frequency decreases due to an increase in load or a decrease in power generation in the power grid, by controlling the SOC of the energy storage apparatus to decrease, the decreased electrical energy of the energy storage apparatus is injected into the power grid. That is, the energy storage apparatus injects energy into the power grid. For example, when the system frequency increases due to a decrease in load or an increase in power generation in the power grid, by controlling the SOC of the energy storage apparatus to increase, the surplus electric energy of the power grid is stored as electric energy of the energy storage apparatus. That is, the energy storage apparatus absorbs energy from the power grid.

In some embodiments of the disclosure, the absolute value of the deviation value of the system frequency obtained by the frequency adjustment apparatus is 0.6 Hz. 0.6 Hz is less than the first frequency control threshold of 1.0 Hz (i.e., the threshold of new energy action frequency deviation) and less than the second frequency control threshold of 1.5 Hz (e.g., the threshold of system security frequency). When the frequency adjustment apparatus detects that the absolute value of the deviation value of the system frequency is less than the first frequency control threshold and less than the second frequency control threshold, the frequency adjustment apparatus determines a first frequency adjustment scheme. The first frequency adjustment scheme includes an operation that the new energy support machine is controlled to be connected.

The operation that the frequency adjustment apparatus controls the new energy support machine to be connected includes the following operations. A first active adjustment instruction $\Delta P_1$ is generated, such that the control sub-station of the new energy support machine controls, in response to the first active adjustment instruction $\Delta P_1$, the new energy support machine to adjust the active power $P_S$ and the electric energy interacting between the stator of the new energy support machine and the power grid by adjusting the rotational speed of the rotor, so as to ultimately adjust the system frequency.

It is to be noted that the new energy support machine executes the first active adjustment instruction $\Delta P_1$ to adjust the system frequency by controlling the rotor of the new energy support machine to increase the rotational speed or decrease the rotational speed.

In some embodiments of the disclosure, the operation that the first active adjustment instruction $\Delta P_1$ is generated includes an operation that an expected active power instruction value $\Delta P_{10}$ of the new energy support machine is calculated.

$$\Delta P_{10} = K_1(\Delta f \pm \Delta f_{01}), \qquad (3)$$

the absolute value of $\square f$ is greater than $\Delta f_{01} =$

-continued
$$\begin{cases} K_1(\Delta f - \Delta f_{01}), & \square f \text{ is a positive value} \\ K_1(\Delta f + \Delta f_{01}), & \square f \text{ is a nonpositive value} \end{cases}$$

In the equation (3), $\Delta f_{01}$ is the frequency response deadband, and the value of $\Delta f_{01}$ is a positive value, e.g., 0.01 Hz. $K_1$ is the frequency-active power coefficient of the new energy support machine, and the value of $K_1$ is a negative value, e.g., −1M W/Hz. The absolute value of $\square f$ is greater than $\Delta f_{01}$.

In the equation (3), when the deviation value of the system frequency $\Delta f$ is positive, the adjustment value of the system frequency is obtained by subtracting the frequency response deadband from the deviation value of the system frequency. When the deviation value of the system frequency $\Delta f$ is negative, the adjustment value of the system frequency is obtained by adding the frequency response deadband to the deviation value of the system frequency. When the frequency response deadband is not considered, the value of $\Delta f_{01}$ is taken as zero in the equation (3).

In the equation (3), when the deviation value of the system frequency $\Delta f$ is positive, $\Delta P_{10}$ is negative. That is, energy is absorbed from the power grid by controlling the new energy support machine to increase the rotational speed, thereby decreasing the system frequency and the deviation value of the system frequency. When the deviation value of the system frequency $\Delta f$ is negative, $\Delta P_{10}$ is positive. That is, energy is injected into the power grid by controlling the new energy support machine to decrease the rotational speed, thereby increasing the system frequency and the deviation value of the system frequency.

In some embodiments of the disclosure, as shown in FIG. 3, the above expected active power instruction value $\Delta P_{10}$ of the new energy support machine is sent from a station-level controller to a control apparatus of the new energy support machine (e.g., the control apparatus 1 in FIG. 4) through a communication device (in a wired manner or in a wireless manner), and is executed by the control apparatus.

The control apparatus of the new energy support machine controls, based on the obtained expected active power instruction value $\Delta P_{10}$ of the new energy support machine, the new energy support machine to release the rotational kinetic energy thereof or increase the rotational kinetic energy thereof according to the expected active power instruction value of the new energy support machine, i.e., controls the new energy support machine to reduce the rotational speed thereof or increase the rotational speed thereof, so as to realize energy injection into the power grid or energy absorption from the power grid. The method and operation for controlling the new energy support machine to adjust the rotational speed thereof would not be repeated.

In some embodiments of the disclosure, taking into account the limitation on the capacity and the rotational speed of the new energy support machine, the method further includes the following operation. The control apparatus of the new energy support machine corrects the received expected active power instruction value of the new energy support machine according to the upper threshold and lower threshold of the rotational speed of the new energy support machine.

In some embodiments of the disclosure, the operation that the expected active power instruction value of the new energy support machine is corrected includes the following operations. The expected active power instruction value $\Delta P_{10}$ of the new energy support machine is corrected by the following equation according to the obtained rotational speed @ of the rotor (which corresponds to $N_1$ in FIG. 4), and the first execution active power instruction value $\Delta P_{11}$ is obtained.

$$\Delta P_{11} = \begin{cases} 0, & \Delta P_{10} < 0 \text{ and } \omega \geq \omega_{max} \\ 0, & \Delta P_{10} > 0 \text{ and } \omega \leq \omega_{min} \\ \Delta P_{10}, & \text{others} \end{cases} \quad (4)$$

In the equation (4), $\omega_{max}$ and $\omega_{min}$ are the upper threshold (i.e., the maximum rotational speed) of the rotational speed of the new energy support machine and the lower threshold (i.e., the minimum rotational speed) of the rotational speed of the new energy support machine, respectively.

It is to be noted that the generated expected active power instruction value $\Delta P_{10}$ of the new energy support machine is negative when electric energy is expected to be released from the power grid to the new energy support machine. However, in such case, if the rotational speed $\omega$ of the new energy support machine is higher than the upper threshold of the rotational speed, for the limitation of the maximum rotational speed, it is necessary to determine that the first execution active power instruction value is 0. In such case, the first active power instruction value is distributed as zero, and the new energy support machine is controlled not to exchange energy with the power grid. In such case, instead of the received expected active power instruction value $\Delta P_{10}$ of the new energy support machine, the first execution active power instruction value $\Delta P_{11}$ is executed.

It is to be noted that the generated expected active power instruction value $\Delta P\mathbf{10}$ of the new energy support machine is positive when electric energy is expected to be released from the new energy support machine to the power grid. However, in such case, if the rotational speed $\omega$ of the rotor of the doubly-fed asynchronous generator is lower than the lower threshold of the rotational speed, for the limitation of the minimum rotational speed, it is necessary to correct the first execution active power instruction value as 0. In such case, the first generator execution active power instruction value is distributed as zero, and the new energy support machine is controlled not to exchange energy with the power grid. In such case, instead of the received expected active power instruction value $\Delta P_{10}$ of the new energy support machine, the first execution active power instruction value $\Delta P_{11}$ is executed. The control method for the doubly-fed asynchronous generator may be referred to CN111193273B and CN111262254B.

It is to be noted that the above operations that the expected active power instruction value of the new energy support machine is corrected are executed by the sub-station side. In other embodiments, the correction may also be executed by a station level, i.e., a centralized controller. In such case, the centralized controller may obtain the rotational speed of the new energy support machine in advance, and generate the expected active power instruction value of the new energy support machine according to the obtained rotational speed of the new energy support machine. That is, the equation (3) and equation (4) are combined into a single equation to realize, which would not be repeated.

In some embodiments of the disclosure, the absolute value of the deviation value of the system frequency obtained by the frequency adjustment apparatus is 1.2 Hz. 1.2 Hz is greater than the first frequency control threshold and less than the second frequency control threshold of 1.5 Hz (e.g., less than the threshold of system security frequency). When the frequency adjustment apparatus detects that the absolute value of the deviation value of the system frequency is greater than the first frequency control threshold and less than the second frequency control threshold, the frequency adjustment apparatus determines a second frequency adjustment scheme, and the second frequency adjustment scheme includes operations that the new energy support machine is controlled to be connected and the energy storage apparatus is controlled to be connected.

The operation that the frequency adjustment apparatus controls the new energy support machine to be connected is similar to that in the above embodiment and would not be repeated.

The operation that the frequency adjustment apparatus controls the energy storage apparatus includes the following operations. A second active adjustment instruction $\Delta P_2$ is generated, such that the electrochemical energy storage apparatus controls, in response to the second active adjustment instruction $\Delta P_2$, the electrochemical energy storage apparatus to adjust the electric energy or the active power interacting between the electrochemical energy storage apparatus and the power grid by adjusting the SOC, so as to ultimately adjust the system frequency.

It is to be noted that the energy storage apparatus executes the second active adjustment instruction $\Delta P_2$ to adjust the system frequency by controlling the charge or discharge of the energy storage apparatus.

In some embodiments of the disclosure, the operation that the second active adjustment instruction $\Delta P_2$ is generated includes an operation that an expected active power instruction value $\Delta P_{20}$ of the energy storage is calculated.

$$\Delta P_{20} = K_2(\Delta f \pm \Delta f_{02}), \quad (5)$$

the absolute value of $\Box f$ is greater than $\Delta f_{02} =$ $$\begin{cases} K_2(\Delta f - \Delta f_{02}), & \Box f \text{ is a positive value} \\ K_2(\Delta f + \Delta f_{02}), & \Box f \text{ is a nonpositive value} \end{cases}$$

In the equation (5), $\Delta f_{02}$ is the frequency response deadband, and the value of $\Delta f_{02}$ is a positive value, e.g., 0.02 Hz. $K_2$ is the frequency-active power coefficient of the energy storage, and the value of $K_2$ is a negative value, e.g., $-1M$ W/Hz. The absolute value of $\Box f$ is greater than $\Delta f_{02}$.

In the equation (5), when the deviation value of the system frequency $\Delta f$ is positive, the adjustment value of the system frequency is obtained by subtracting the frequency response deadband from the deviation value of the system frequency. When the deviation value of the system frequency $\Delta f$ is negative, the adjustment value of the system frequency is obtained by adding the frequency response deadband to the deviation value of the system frequency. When the frequency response deadband is not considered, the value of $\Delta f_{02}$ is taken as zero in the equation (5).

When the deviation value of the system frequency is positive, $\Delta P_{20}$ is negative. That is, energy is absorbed from the power grid by controlling the energy storage apparatus to absorb and store electrical energy, thereby decreasing the system frequency and the deviation value of the system frequency. When the deviation value of the system frequency is negative, $\Delta P_{20}$ is positive. That is, energy is injected into the power grid by controlling the energy storage apparatus to release and reduce the electrical energy, so that the system frequency is increased and the deviation value of the system frequency is decreased.

In some embodiments of the disclosure, as shown in FIG. 3, the above expected active power instruction value $\Delta P_{20}$ of the energy storage is sent from a centralized controller to a control apparatus of the electrochemical energy storage apparatus (e.g., the control apparatus 2 in FIG. 4) through a communication device (in a wired manner or in a wireless manner), and is executed by the control apparatus.

The control apparatus of the electrochemical energy storage apparatus controls, based on the obtained second active adjustment instruction $\Delta P_2$, the energy storage apparatus to release the electrical energy thereof or store the electrical energy according to the expected active power instruction value $\Delta P_{20}$ of the energy storage. That is, the SOC of the electrochemical energy storage apparatus is decreased to realize energy injection into the power grid, or the SOC of the electrochemical energy storage apparatus is increased to realize energy absorption from the power grid. The method and operation for controlling the energy storage apparatus to adjust its SOC to adjust the active power and electrical energy would not be repeated.

In some embodiments of the disclosure, taking into account the capacity and the upper and lower thresholds of the SOC of the energy storage apparatus, the method further includes the following operation. The control apparatus of the electrochemical energy storage apparatus corrects the received expected active power instruction value of the energy storage according to the upper threshold and lower threshold of the SOC of the energy storage apparatus.

In some embodiments of the disclosure, the operation that the expected active power instruction value of the energy storage is corrected includes the following operations. The expected active power instruction value $\Delta P_{20}$ of the energy storage is corrected by the following equation according to the obtained SOC of the energy storage apparatus, and the second execution active power instruction value $\Delta P_{22}$ is obtained.

$$\Delta P_2 = \begin{cases} 0, & \Delta P_{20} < 0 \text{ and } SOC > SOC_{max} \\ 0, & \Delta P_{20} > 0 \text{ and } SOC < SOC_{min} \\ \Delta P_{20}, & \text{others} \end{cases} \qquad (6)$$

In the equation (6), $SOC_{max}$ and $SOC_{min}$ are the upper threshold of the SOC and the lower threshold of the SOC of the electrochemical energy storage apparatus, respectively.

It is to be noted that the generated expected active power instruction value $\Delta P_{20}$ of the energy storage is negative when it is expected that the electric energy is released from the power grid to the energy storage apparatus. However, in such case, if the SOC of the energy storage apparatus is higher than the upper threshold of the SOC, for the safety of the energy storage apparatus, it is necessary to determine that the second execution active power instruction value is 0. In such case, the second active power instruction value is distributed as zero, and the electrochemical energy storage apparatus is controlled not to exchange energy with the power grid. In such case, instead of the received expected active power instruction value $\Delta P_{20}$ of the energy storage, the second execution active power instruction value $\Delta P_{22}$ is executed.

The generated expected active power instruction value $\Delta P_{20}$ of the energy storage is positive when it is expected that the electric energy is released from the energy storage apparatus to the power grid. However, in such case, if the SOC of the energy storage apparatus is lower than the lower threshold of the SOC, for the safety of the energy storage apparatus, it is necessary to determine that the second execution active power instruction value is 0. In such case, the second active power instruction value is distributed as zero, and the electrochemical energy storage apparatus is controlled not to exchange energy with the power grid. In such case, instead of the received expected active power instruction value $\Delta P_{20}$ of the energy storage, the second execution active power instruction value $\Delta P_{22}$ is executed.

The above operations that the expected active power instruction value of the electrochemical energy storage is corrected are executed by the sub-station side. In other embodiments, the correction may also be executed by a station level, i.e., a centralized controller. In such case, the centralized controller may obtain the SOC of the energy storage apparatus in advance, and generate the expected active power instruction value of the energy storage according to the obtained SOC of the energy storage apparatus. That is, the equation (5) and equation (6) are combined in a single equation to realize, which would not be repeated.

In some embodiments of the disclosure, in a specific implementation, multiple new energy support machines or multiple groups of electrochemical energy storage apparatuses may be disposed near the new energy station. In such case, the multiple new energy support machines may be equated to a new energy support machine, and the multiple groups energy storage apparatuses may be equated to an energy storage apparatus. And then, the aforementioned frequency adjustment method is still adopted to perform frequency adjustment control for the new energy station, thereby improving the operational safety of the energy storage apparatus.

In some embodiments of the disclosure, during an execution cycle of the frequency adjustment control strategy, the centralized controller generates, according to the obtained various physical quantity data, the active adjustment instructions (i.e., the frequency adjustment instructions) distributed to the control sub-station of the energy storage and/or the control sub-station of the new energy, respectively. The method includes the following operations.

(1) The centralized controller reads the AC system frequency f, the rotational speed $\omega$ of the rotor of the doubly-fed asynchronous generator ($N_1$ in FIG. 3), and the SOC of the energy storage apparatus.

(2) The centralized controller reads at least one of the active control mode or the active power adjustment instruction P distributed by the upper dispatching department. There may be one or more centralized controllers. The centralized controller may distribute the active control mode and/or the active power control instruction P respectively to a combination of one or more groups of control sub-stations of the energy storage and/or of control sub-stations of the new energy support machine.

(3) The centralized controller determines whether the absolute value of the deviation value of the system frequency is greater than the first frequency control threshold $f_1$ according to the obtained system frequency f. If it is greater than the first frequency deviation threshold $f_1$, the operation (4) is performed. Otherwise, the operation (7) is performed. When the rated frequency of the power grid is 50 Hz, the deviation value of the system frequency is the difference between the current system frequency and the rated frequency of the power grid, which may be a positive value or a negative value.

(4) The centralized controller determines whether the deviation value of the system frequency is less than the second frequency deviation threshold $f_2$. If it is less than the second frequency deviation threshold $f_2$, the operation (5) is performed. Otherwise, the operation (10) is performed.

Here, the second frequency deviation threshold is a positive value greater than the first frequency deviation threshold. Therefore, only when the deviation value of the system frequency exceeds the first frequency deviation threshold, it is necessary to perform the operation (4) to further determine whether the deviation value of the system frequency is less than the second frequency deviation threshold. If the deviation value of the system frequency does not exceed the first frequency deviation threshold, the operation (7) is performed to execute the operations for the first frequency adjustment range.

The second frequency deviation threshold may take the system safety frequency threshold or a smaller value.

(5) The expected active power instruction value $\Delta P_{20}$ of the energy storage is calculated according to the equation (3).

(6) The expected active power instruction value $\Delta P_{20}$ of the energy storage is corrected using the equation (4) according to the obtained SOC of the energy storage apparatus, and the second execution active power instruction value $\Delta P_{22}$ is obtained.

(7) The expected active power instruction value $\Delta P_{10}$ of the new energy support machine is calculated using the equation (1).

(8) The expected active power instruction value $\Delta P_{10}$ of the new energy support machine is corrected using the equation (2) according to the obtained rotational speed w of the rotor, and the first execution active power instruction value $\Delta Pu$ is obtained.

(9) The centralized controller distributes the active adjustment instructions $\Delta P_{10}$ and $\Delta P_{20}$ to at least one of the control apparatus 2 or the control apparatus 1, and return to the operation (1).

(10) Other frequency adjustment operations are executed as pre-agreed, and return to the operation (1).

With the above operations, by setting the first frequency adjustment range and the second frequency adjustment range, it is realized that frequency adjustment measures are adopted correspondingly according to the severity of system frequency fluctuation. For example, when the severity is low, it is within the first frequency adjustment range, the operations (5) to (9) are executed, and the new energy support machine is connected to perform frequency adjustment. For example, when the severity is high, it is within the second frequency adjustment range, the operations (7) to (9) are executed, and the new energy support machine and the electrochemical energy storage apparatus are connected simultaneously to perform frequency adjustment.

Figure 9:
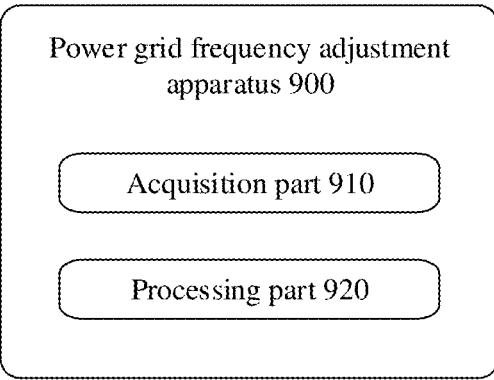
FIG. 9 is a composition diagram of a frequency adjustment apparatus based on a new energy support machine and an energy storage apparatus of an embodiment of the disclosure.

In some embodiments of the disclosure, as shown in FIG. 9, a frequency adjustment apparatus 900 based on a new energy support machine and an energy storage apparatus of an embodiment of the disclosure includes an acquisition part 910 and a processing part 920.

The acquisition part 910 is configured to obtain a deviation value of a system frequency.

The processing part 920 is configured to: determine, according to the deviation value of the system frequency, a frequency adjustment scheme for at least one of the new energy support machine or the energy storage apparatus; and generate, according to the frequency adjustment scheme, a frequency adjustment instruction for at least one of the new energy support machine or the energy storage apparatus, such that at least one of the new energy support machine or the energy storage apparatus executes a corresponding frequency adjustment instruction to adjust the system frequency.

In some embodiments of the disclosure, the processing part 920 is further configured to determine a first frequency adjustment scheme when it is detected that an absolute value of the deviation value of the system frequency is not greater than a first frequency control threshold. The first frequency adjustment scheme includes an operation that the new energy support machine is controlled to be connected.

In some embodiments of the disclosure, the processing part 920 is further configured to generate, according to the first frequency adjustment scheme, a first active adjustment instruction for the new energy support machine within a first frequency adjustment range, such that the new energy support machine executes the first active adjustment instruction to adjust the system frequency by means of controlling the new energy support machine to increase a rotational speed or decrease the rotational speed.

In some embodiments of the disclosure, the processing part 920 is further configured to determine a second frequency adjustment scheme when it is detected that the absolute value of the deviation value of the system frequency is greater than the first frequency control threshold and less than a second frequency control threshold. The second frequency adjustment scheme includes operations that the new energy support machine is controlled to be connected and the energy storage apparatus is controlled to be connected. The first frequency control threshold is a positive value, and the second frequency control threshold is a positive value greater than the first frequency control threshold.

In some embodiments of the disclosure, the processing part 920 is further configured to generate, according to the second frequency adjustment scheme, a first active adjustment instruction for the new energy support machine within a second frequency adjustment range, such that the new energy support machine executes the first active adjustment instruction to adjust the system frequency by means of controlling the new energy support machine to increase a rotational speed or decrease the rotational speed; and generate, according to the second frequency adjustment scheme, a second active adjustment instruction for the energy storage apparatus within the second frequency adjustment range, such that the energy storage apparatus executes the first active adjustment instruction to adjust the system frequency by means of controlling charge or discharge of the energy storage apparatus.

In some embodiments of the disclosure, the processing part 920 is further configured to correct, according to the rotational speed of the new energy support machine, an expected active power instruction value of the new energy support machine corresponding to the first active adjustment instruction.

In some embodiments of the disclosure, the processing part 920 is further configured to correct, according to a state of charge of the energy storage apparatus, an expected active power instruction value of the energy storage corresponding to the second active adjustment instruction.

A power grid frequency adjustment system based on a new energy support machine and an energy storage apparatus of an embodiment of the disclosure includes an acquisition part, a processing part, a control part of the new energy support machine, and a control part of the energy storage apparatus.

The acquisition part is configured to obtain a deviation value of a system frequency.

The processing part is configured to: determine, according to the deviation value of the system frequency, a frequency adjustment scheme for at least one of the new energy support machine or the energy storage apparatus; and generate, according to the frequency adjustment scheme, a frequency adjustment instruction for at least one of the new energy support machine or the energy storage apparatus, such that at least one of the new energy support machine or the energy storage apparatus executes a corresponding frequency adjustment instruction to adjust the system frequency.

The control part of the new energy support machine is configured to obtain a corresponding frequency adjustment instruction from the processing part and control the new energy support machine to execute the corresponding frequency adjustment instruction.

The control part of the energy storage apparatus is configured to obtain a corresponding frequency adjustment instruction from the processing part and control the energy storage apparatus to execute the corresponding frequency adjustment instruction.

A new energy station of an embodiment of the disclosure includes a new energy power generator, a new energy support machine, an electrochemical energy storage apparatus and the power grid frequency adjustment system as described above.

The new energy power generator is connected to a power grid at a new energy grid connection point.

The new energy support machine is connected to the new energy grid connection point.

The electrochemical energy storage apparatus is connected to the new energy grid connection point.

The method of active power adjustment is illustrated above. When an imbalance or fault occurs in the power grid, adjustment for reactive power is also included, which would not be repeated.

It is to be understood by those skilled in the art that embodiments of the disclosure may be provided as methods, systems, or computer program products. Therefore, the disclosure may adopt the form of a fully hardware embodiment, the form of a fully software embodiment, or the form of combining embodiments in software and hardware aspects. Furthermore, the disclosure may adopt the form of a computer program product implemented on one or more computer-usable storage media (which includes, but is not limited to a disk memory, a Compact Disc Read-Only Memory (CD-ROM), an optical memory, or the like) that contain computer-usable program codes therein.

The disclosure is described with reference to flowcharts and/or block diagrams according to methods, devices (systems), and computer program products of the embodiments of the disclosure. It is to be understood that each of the flows and/or blocks in the flowchart and/or block diagram, and a combination of flows and/or blocks in the flowchart and/or block diagram, may be implemented by computer program instructions. These computer program instructions may be provided to a processor of a general purpose computer, a special purpose computer, an embedded processor, or other programmable data processing devices, to produce a machine, such that instructions executed by the processor of a computer or other programmable data processing devices can produce an apparatus for implementing functions specified in one or more flows in the flowchart and/or one or more blocks in the block diagram.

These computer program instructions may also be stored in a computer-readable memory that may direct a computer or other programmable data processing devices to operate in a particular manner, such that instructions stored in the computer-readable memory produce a manufactured product including an instruction apparatus, and the instruction apparatus implements functions specified in one or more flows in the flowchart and/or one or more blocks in the block diagram.

These computer program instructions may also be loaded onto a computer or other programmable data processing devices, such that a series of operation steps are executed on the computer or other programmable devices to produce computer-implemented processing, and thus instructions executed on the computer or other programmable devices provide steps for implementing functions specified in one or more flows in the flowchart and/or one or more blocks in the block diagram.

The disclosure has been described above with reference to a few implementations. However, as is well known to those skilled in the art, as limited by the accompanying claims, embodiments other than those disclosed above in the disclosure fall equivalently within the scope of the disclosure.

Generally, all terms used in the claims are explained according to the ordinary meaning in the art, unless otherwise expressly defined therein. All references to "a/the [apparatus, assembly, or the like]" are openly explained as at least one example of the apparatus, assembly, or the like, unless otherwise explicitly illustrated. It is not necessary for the steps of any method disclosed herein to be run in the disclosed exact order, unless explicitly illustrated.

INDUSTRIAL APPLICABILITY

Embodiments of the disclosure disclose a frequency adjustment method, an apparatus and a system based on a new energy support machine and an energy storage device, and a new energy station. The method includes the following operations. A deviation value of a system frequency is obtained. A frequency adjustment scheme for at least one of the new energy support machine or the energy storage apparatus is determined according to the deviation value of the system frequency. A frequency adjustment instruction for at least one of the new energy support machine or the energy storage apparatus is generated according to the frequency adjustment scheme, such that at least one of the new energy support machine or the energy storage apparatus executes a corresponding frequency adjustment instruction to adjust the system frequency. The method has a high regularity, a flexibility in rule adjustment and a good real-time performance. When system frequency fluctuation occurs in the power grid, the new energy support machine with a better durability is connected to provide support to the power grid. Only when the system frequency fluctuation is too large, the electrochemical energy storage apparatus with a poorer durability is connected to collectively provide support to the power grid, thereby reducing the number of times of connecting the energy storage apparatus, realizing the safe operation of the energy storage apparatus and improving the utilization safety of the energy storage apparatus.

The invention claimed is:

1. A frequency adjustment method based on a new energy support machine and an energy storage apparatus, wherein
   the new energy support machine is connected to a power grid at a new energy grid connection point, and
   the energy storage apparatus is connected to the power grid at the new energy grid connection point; and
   wherein the new energy grid comprises at least one wind turbine;

wherein the new energy support machine comprises: a main transformer, an excitation transformer, a doubly-fed asynchronous generator and a frequency converter;

wherein the new energy support machine is configured to, when a system frequency of the power grid fluctuates, provide support to the power grid by injecting energy into the power grid to adjust the system frequency, wherein the method comprises:

obtaining a deviation value of the system frequency when the system frequency of the power grid fluctuates;

determining, according to the deviation value of the system frequency, a frequency adjustment scheme for at least one of the new energy support machine or the energy storage apparatus; and generating, according to the frequency adjustment scheme, a frequency adjustment instruction for at least one of the new energy support machine or the energy storage apparatus, such that at least one of the new energy support machine or the energy storage apparatus executes a corresponding frequency adjustment instruction to adjust the system frequency, wherein determining, according to the deviation value of the system frequency, a frequency adjustment scheme for at least one of the new energy support machine or the energy storage apparatus comprises:

determining whether an absolute value of the deviation value of the system frequency is greater than a first frequency control threshold, and determining whether the absolute value of the deviation value of the system frequency is less than a second frequency control threshold, wherein the first frequency control threshold is a positive value, and the second frequency control threshold is a positive value greater than the first frequency control threshold, determining a first frequency adjustment scheme when it is determined that the absolute value of the deviation value of the system frequency is not greater than the first frequency control threshold, wherein the first frequency adjustment scheme comprises controlling the new energy support machine to be connected into the power grid to perform frequency adjustment; and determining a second frequency adjustment scheme when it is determined that the absolute value of the deviation value of the system frequency is greater than the first frequency control threshold and less than the second frequency control threshold, wherein the second frequency adjustment scheme comprises controlling the new energy support machine to be connected into the power grid to perform the frequency adjustment and controlling the energy storage apparatus to be connected into the power grid to perform the frequency adjustment, wherein controlling the new energy support machine to be connected into the power grid to perform the frequency adjustment comprises:

when the system frequency decreases due to an increase in load or a decrease in power generation in the power grid, decreasing a rotational speed of a rotor of the doubly-fed asynchronous generator of the new energy support machine to make decreased kinetic energy of the doubly-fed asynchronous generator to be injected into the power grid; and when the system frequency increases due to a decrease in the load or an increase in the power generation in the power grid, increasing the rotational speed of the rotor of the doubly-fed asynchronous generator of the new energy support machine to make surplus electric energy of the power grid to be stored as kinetic energy of a stator of the doubly-fed asynchronous generator, wherein controlling the energy storage apparatus to be connected into the power grid to perform the frequency adjustment comprises:

when the system frequency decreases due to the increase in the load or the decrease in the power generation in the power grid, decreasing a state of charge (SOC) of the energy storage apparatus to make decreased electrical energy of the energy storage apparatus to be injected into the power grid; and when the system frequency increases due to the decrease in the load or the increase in the power generation in the power grid, increasing the SOC of the energy storage apparatus to make the surplus electric energy of the power grid to be stored as electric energy of the energy storage apparatus.

2. The frequency adjustment method of claim 1, further comprising:

generating, according to the first frequency adjustment scheme, a first active adjustment instruction for the new energy support machine within a first frequency adjustment range, such that the new energy support machine executes the first active adjustment instruction to adjust the system frequency by means of controlling the new energy support machine to increase the rotational speed or decrease the rotational speed.

3. The frequency adjustment method of claim 2, wherein after generating, according to the first frequency adjustment scheme, the first active adjustment instruction for the new energy support machine within the first frequency adjustment range, the method further comprises:

correcting, according to the rotational speed of the new energy support machine, an expected active power instruction value of the new energy support machine corresponding to the first active adjustment instruction.

4. The frequency adjustment method of claim 1, further comprising:

generating, according to the second frequency adjustment scheme, a first active adjustment instruction for the new energy support machine within a second frequency adjustment range, such that the new energy support machine executes the first active adjustment instruction to adjust the system frequency by means of controlling the new energy support machine to increase the rotational speed or decrease the rotational speed; and generating, according to the second frequency adjustment scheme, a second active adjustment instruction for the energy storage apparatus within the second frequency adjustment range, such that the energy storage apparatus executes the second active adjustment instruction to adjust the system frequency by means of controlling charge or discharge of the energy storage apparatus.

5. The frequency adjustment method of claim 4, wherein after generating, according to the second frequency adjustment scheme, the second active adjustment instruction for the energy storage apparatus within the second frequency adjustment range, the method further comprises:

correcting, according to the SOC of the energy storage apparatus, an expected active power instruction value of the energy storage apparatus corresponding to the second active adjustment instruction.

6. A frequency adjustment device based on a new energy support machine and an energy storage apparatus, wherein the new energy support machine is connected to a power grid at a new energy grid connection point, and the energy storage apparatus is connected to the power grid at the new energy grid connection point; and wherein the new energy grid comprises at least one wind turbine;

wherein the new energy support machine comprises: a main transformer, an excitation transformer, a doubly-fed asynchronous generator and a frequency converter;

wherein the new energy support machine is configured to, when a system frequency of the power grid fluctuates, provide support to the power grid by injecting energy into the power grid to adjust the system frequency, wherein the frequency adjustment device comprises:

a memory configured to store a computer program; and a processor, wherein the processor is configured to:

obtain a deviation value of the system frequency when the system frequency of the power grid fluctuates; and determine, according to the deviation value of the system frequency, a frequency adjustment scheme for at least one of the new energy support machine or the energy storage apparatus; and generate, according to the frequency adjustment scheme, a frequency adjustment instruction for at least one of the new energy support machine or the energy storage apparatus, such that at least one of the new energy support machine or the energy storage apparatus executes a corresponding frequency adjustment instruction to adjust the system frequency, wherein the processor is further configured to:

determine whether an absolute value of the deviation value of the system frequency is greater than a first frequency control threshold, and determine whether the absolute value of the deviation value of the system frequency is less than a second frequency control threshold, wherein the first frequency control threshold is a positive value, and the second frequency control threshold is a positive value greater than the first frequency control threshold, determine a first frequency adjustment scheme when it is determined that the absolute value of the deviation value of the system frequency is not greater than the first frequency control threshold, wherein the first frequency adjustment scheme comprises controlling the new energy support machine to be connected into the power grid to perform frequency adjustment; and determine a second frequency adjustment scheme when it is determined that the absolute value of the deviation value of the system frequency is greater than the first frequency control threshold and less than the second frequency control threshold, wherein the second frequency adjustment scheme comprises controlling the new energy support machine to be connected into the power grid to perform the frequency adjustment and controlling the energy storage apparatus to be connected into the power grid to perform the frequency adjustment, wherein controlling the new energy support machine to be connected into the power grid to perform the frequency adjustment comprises:

when the system frequency decreases due to an increase in load or a decrease in power generation in the power grid, decreasing a rotational speed of a rotor of the doubly-fed asynchronous generator of the new energy support machine to make decreased kinetic energy of the doubly-fed asynchronous generator to be injected into the power grid; and when the system frequency increases due to a decrease in the load or an increase in the power generation in the power grid, increasing the rotational speed of the rotor of the doubly-fed asynchronous generator of the new energy support machine to make surplus electric energy of the power grid to be stored as kinetic energy of a stator of the doubly-fed asynchronous generator, wherein controlling the energy storage apparatus to be connected into the power grid to perform the frequency adjustment comprises:

when the system frequency decreases due to the increase in the load or the decrease in the power generation in the power grid, decreasing a state of charge (SOC) of the energy storage apparatus to make decreased electrical energy of the energy storage apparatus to be injected into the power grid; and when the system frequency increases due to the decrease in the load or the increase in the power generation in the power grid, increasing the SOC of the energy storage apparatus to make the surplus electric energy of the power grid to be stored as electric energy of the energy storage apparatus.

7. The frequency adjustment device of claim 6, wherein the processor is further configured to generate, according to the first frequency adjustment scheme, a first active adjustment instruction for the new energy support machine within a first frequency adjustment range, such that the new energy support machine executes the first active adjustment instruction to adjust the system frequency by means of controlling the new energy support machine to increase the rotational speed or decrease the rotational speed.

8. The frequency adjustment device of claim 7, wherein the processor is further configured to correct, according to the rotational speed of the new energy support machine, an expected active power instruction value of the new energy support machine corresponding to the first active adjustment instruction.

9. The frequency adjustment device of claim 6, wherein the processor is further configured to:

generate, according to the second frequency adjustment scheme, a first active adjustment instruction for the new energy support machine within a second frequency adjustment range, such that the new energy support machine executes the first active adjustment instruction to adjust the system frequency by means of controlling the new energy support machine to increase the rotational speed or decrease the rotational speed; and generate, according to the second frequency adjustment scheme, a second active adjustment instruction for the energy storage apparatus within the second frequency adjustment range, such that the energy storage apparatus executes the second active adjustment instruction to adjust the system frequency by means of controlling charge or discharge of the energy storage apparatus.

10. The frequency adjustment device of claim 9, wherein the processor is further configured to correct, according to the SOC of the energy storage apparatus, an expected active power instruction value of the energy storage apparatus corresponding to the second active adjustment instruction.

11. A power grid frequency adjustment system based on a new energy support machine and an energy storage apparatus, comprising:

the frequency adjustment device based on the new energy support machine and the energy storage apparatus of claim 6;

a processor of the new energy support machine, configured to obtain a corresponding frequency adjustment instruction from the processor of the frequency adjustment device and control the new energy support machine to execute the corresponding frequency adjustment instruction; and a processor of the energy storage apparatus, configured to obtain a corresponding frequency adjustment instruction from the processor of the frequency adjustment device and control the energy storage apparatus to execute the corresponding frequency adjustment instruction.

12. A new energy station, comprising:

a new energy power generator, connected to a power grid at a new energy grid connection point;

a new energy support machine, connected to the new energy grid connection point;

an energy storage apparatus, connected to the new energy grid connection point; and the power grid frequency adjustment system of claim 11;

wherein the new energy power generator comprises a wind turbine.

\* \* \* \* \*